US011747094B2

(12) United States Patent
Stoia et al.

(10) Patent No.: US 11,747,094 B2
(45) Date of Patent: Sep. 5, 2023

(54) HOLLOW LATTICE THERMAL ENERGY STORAGE HEAT EXCHANGER

(71) Applicant: The Boeing Company, Chicago, IL (US)

(72) Inventors: Michael F. Stoia, Chicago, IL (US); Arun Muley, Chicago, IL (US); Douglas H. Van Afielen, Chicago, IL (US)

(73) Assignee: The Boeing Company, Chicago, IL (US)

( * ) Notice: Subject to any disclaimer, the term of this patent is extended or adjusted under 35 U.S.C. 154(b) by 481 days.

(21) Appl. No.: 15/593,609

(22) Filed: May 12, 2017

(65) Prior Publication Data

US 2018/0328673 A1 Nov. 15, 2018

(51) Int. Cl.
*F28D 20/00* (2006.01)
*B23P 15/26* (2006.01)
(Continued)

(52) U.S. Cl.
CPC .......... *F28D 20/0034* (2013.01); *B23P 15/26* (2013.01); *F28D 1/0471* (2013.01);
(Continued)

(58) Field of Classification Search
CPC . Y02E 60/145; F28D 20/021; F28D 20/0034; F28D 1/0471; F28D 1/05366; F28D 7/1615; F28D 7/1684; F28D 2020/0013; F28D 2020/0017; F28D 2020/0078; F28F 2260/02; F28F 2210/02; F28F 1/025; F28F 7/02; F28F 21/062; F28F 21/082; F28F 21/084; F28F 21/086;
(Continued)

(56) References Cited

U.S. PATENT DOCUMENTS 2,813,701 A * 11/1957 Fenger .................. F28D 9/0068
165/147
3,229,762 A * 1/1966 Vollhardt ................ F22B 1/021
165/157

(Continued)

FOREIGN PATENT DOCUMENTS

EP 22234 * 1/1981
WO 2006/095055 A1 9/2006

*Primary Examiner* — Tho V Duong
*Assistant Examiner* — Raheena R Malik
(74) *Attorney, Agent, or Firm* — McDonnell Boehnen Hulbert & Berghoff LLP

(57) ABSTRACT

Example heat exchangers and methods of use are described herein. An example heat exchanger includes a lattice structure including a plurality of conduits defining a plurality of interstitial voids between the plurality of conduits. Each of the plurality of conduits includes an inlet and an outlet, and the plurality of conduits are arranged such that, between the inlet and the outlet, each of the conduits intersects at least one other conduit to enable flow between the intersecting conduits. The example heat exchanger also includes a first manifold formed unitarily with the lattice structure, the first manifold comprising a first plurality of openings in fluid communication with each inlet of the plurality of conduits. The example heat exchanger further includes a phase change material (PCM) disposed within and substantially filling the plurality of interstitial voids.

25 Claims, 7 Drawing Sheets

(51) Int. Cl.
*F28F 21/06* (2006.01)
*F28F 21/08* (2006.01)
*F28F 1/02* (2006.01)
*F28F 7/02* (2006.01)
*F28D 1/053* (2006.01)
*F28F 27/02* (2006.01)
*F28D 20/02* (2006.01)
*F28D 1/047* (2006.01)
*F28D 7/16* (2006.01)

(52) U.S. Cl.
CPC ....... *F28D 1/05366* (2013.01); *F28D 20/021* (2013.01); *F28F 1/025* (2013.01); *F28F 7/02* (2013.01); *F28F 21/062* (2013.01); *F28F 21/082* (2013.01); *F28F 21/084* (2013.01); *F28F 21/086* (2013.01); *F28F 21/087* (2013.01); *F28F 27/02* (2013.01); *F28D 7/1615* (2013.01); *F28D 7/1684* (2013.01); *F28D 2020/0013* (2013.01); *F28D 2020/0017* (2013.01); *F28D 2020/0078* (2013.01); *F28F 2255/04* (2013.01)

(58) Field of Classification Search
CPC ........ F28F 21/087; F28F 27/02; F28F 7/1615; F28F 7/1684; F28F 2255/04; B23P 15/26
USPC .............................................. 165/10, 119, 158
See application file for complete search history.

(56) References Cited

U.S. PATENT DOCUMENTS

| | | | | |
|---|---|---|---|---|
| 4,362,207 A * | 12/1982 | Farfaletti-Casali | ... | F28D 20/003 126/643 |
| 5,107,925 A * | 4/1992 | Veigel | ..................... | F28F 9/167 165/173 |
| 5,213,153 A * | 5/1993 | Itoh | ..................... | F28D 15/0275 165/104.33 |
| 5,598,720 A * | 2/1997 | MacCracken et al. | . | F25D 16/00 165/10 |
| 6,400,896 B1 | 6/2002 | Longardner | | |
| 6,623,687 B1 * | 9/2003 | Gervasi | ..................... | F28F 7/02 264/401 |
| 6,997,242 B2 * | 2/2006 | Fujita | .................... | F17C 11/005 165/104.12 |
| 7,106,777 B2 * | 9/2006 | Delgado, Jr. | ......... | F28D 20/023 372/89 |
| 7,687,132 B1 * | 3/2010 | Gross | .................... | B22F 1/0007 385/129 |
| 7,854,131 B2 | 12/2010 | Ullman | | |
| 8,522,859 B2 | 9/2013 | Moilala | | |
| 8,573,289 B1 * | 11/2013 | Roper | ...................... | F28D 15/04 165/164 |
| 8,657,984 B1 * | 2/2014 | Williams | .......... | B29D 99/0014 156/245 |
| 9,453,604 B1 * | 9/2016 | Maloney | ................. | F16L 41/00 |
| 9,890,827 B2 * | 2/2018 | Schaedler | ............... | F16F 7/121 |
| 10,203,169 B2 * | 2/2019 | Ghioni | ................... | F28F 13/185 |
| 10,471,803 B2 * | 11/2019 | Bidner | ................. | F28D 20/026 |
| 10,502,501 B1 * | 12/2019 | Roper | ....................... | F28D 1/04 |
| 10,527,362 B2 * | 1/2020 | Vos | ........................ | F28F 1/02 |
| 10,556,670 B2 * | 2/2020 | Koppelman | .............. | B64C 3/26 |
| 2005/0258394 A1 * | 11/2005 | Bacher | ................... | C09K 5/063 252/70 |
| 2006/0048929 A1 * | 3/2006 | Aaron | ...................... | F28D 7/08 165/173 |
| 2010/0300669 A1 * | 12/2010 | Jacobsen | ............... | F28F 13/003 165/185 |
| 2014/0251585 A1 * | 9/2014 | Kusuda | ................... | F28D 1/06 165/164 |
| 2016/0054069 A1 * | 2/2016 | Armsden | .............. | B21D 53/085 165/173 |
| 2016/0290738 A1 * | 10/2016 | Kupiszewski | ........... | F28F 1/40 |
| 2016/0341495 A1 * | 11/2016 | Hemker | ...................... | F28F 9/02 |
| 2017/0082372 A1 * | 3/2017 | Vos | ............................ | F28F 1/02 |
| 2017/0145980 A1 * | 5/2017 | Gu | ........................... | F01N 5/02 |
| 2017/0198976 A1 * | 7/2017 | Turney | ................. | F28D 7/0066 |
| 2017/0248372 A1 * | 8/2017 | Erno | ...................... | F28F 9/0275 |
| 2017/0363363 A1 * | 12/2017 | Lassini | ............. | H05K 7/20309 |

* cited by examiner

HOLLOW LATTICE THERMAL ENERGY STORAGE HEAT EXCHANGER

GOVERNMENT RIGHTS

This invention was made with U.S. Government support under Contract No. DE-AR0000577 awarded by the Department of Energy. The Government may have certain rights with regard to the invention.

FIELD

The present disclosure relates generally to a hollow lattice thermal energy storage heat exchanger comprising a shell containing a phase change material matrix and an interconnected latticework of hollow microtubes.

BACKGROUND

Heat exchange with existing phase change materials (PCMs) is inefficient due to their low thermal conductivity. This leads to prolonged response times in thermal energy storage heat exchangers that rely upon PCM as the energy storage medium. In addition, existing thermal energy storage heat exchangers employ designs using tubes with non-tortuous flow paths and relatively large heat transport length scales due to limitations in traditional manufacturing processes, such as brazing, welding, bonding, and tube bending. These designs and manufacturing methods lead to inefficient heat exchanger designs that suffer from: (i) radial thermal stratification in the working fluid and PCM, (ii) axial thermal stratification in the working fluid and PCM, (iii) insufficient contact area between the PCM and working fluid tubes, and (iv) longer heat transfer length scales.

Thermal stratification will reduce efficiency because the working fluid (coolant) temperature near the tube wall will be closer to the PCM temperature than the average working fluid temperature. In other words, the temperature difference between the PCM and adjacent working fluid will be reduced, which inhibits heat transfer. Heat transfer performance is further inhibited when the working fluid (coolant) is not in close thermal communication (i.e., short heat transfer length scales) with the PCM. Therefore, an improved thermal energy storage heat exchanger may be desirable.

SUMMARY

The present disclosure describes a hollow lattice thermal energy storage heat exchanger containing a phase change material matrix and an interconnected latticework of hollow microtubes. These microtubes transport a working fluid (e.g., coolant) through the PCM matrix to facilitate efficient heat exchange. The interconnected latticework of hollow microtubes provide improved efficiency and responsiveness over current state-of-the-art designs by (i) promoting mixing of the coolant fluid as it traverses the heat exchanger, which enhances heat transfer rates and inhibits thermal stratification within the coolant fluid and PCM, (ii) decreasing the heat transport length scales between the coolant fluid and PCM, and (iii) increasing the heat transfer surface area between the microtubes and PCM.

In particular, in one example, a heat exchanger is described. The heat exchanger includes a lattice structure including a plurality of conduits defining a plurality of interstitial voids between the plurality of conduits. Each of the plurality of conduits includes an inlet and an outlet, and the plurality of conduits are arranged such that, between the inlet and the outlet, each of the conduits intersects at least one other conduit to enable flow between the intersecting conduits. The heat exchanger also includes a first manifold formed unitarily with the lattice structure, the first manifold comprising a first plurality of openings in fluid communication with each inlet of the plurality of conduits. The heat exchanger also includes a phase change material (PCM) disposed within and substantially filling the plurality of interstitial voids.

In another example, a method is described. The method includes receiving a fluid into a first plurality of inlets of a plurality of conduits. The plurality of conduits are arranged such that each of the conduits intersects at least one other conduit to enable flow between the intersecting conduits, and a phase change material (PCM) is disposed within and substantially filling a plurality of interstitial voids defined by the plurality of conduits. The method also includes flowing the fluid within the plurality of conduits. The method also includes flowing the fluid out of a plurality of outlets of the plurality of conduits. The method also includes transferring heat between the fluid and the PCM to thereby cause a phase change in the PCM.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 1:
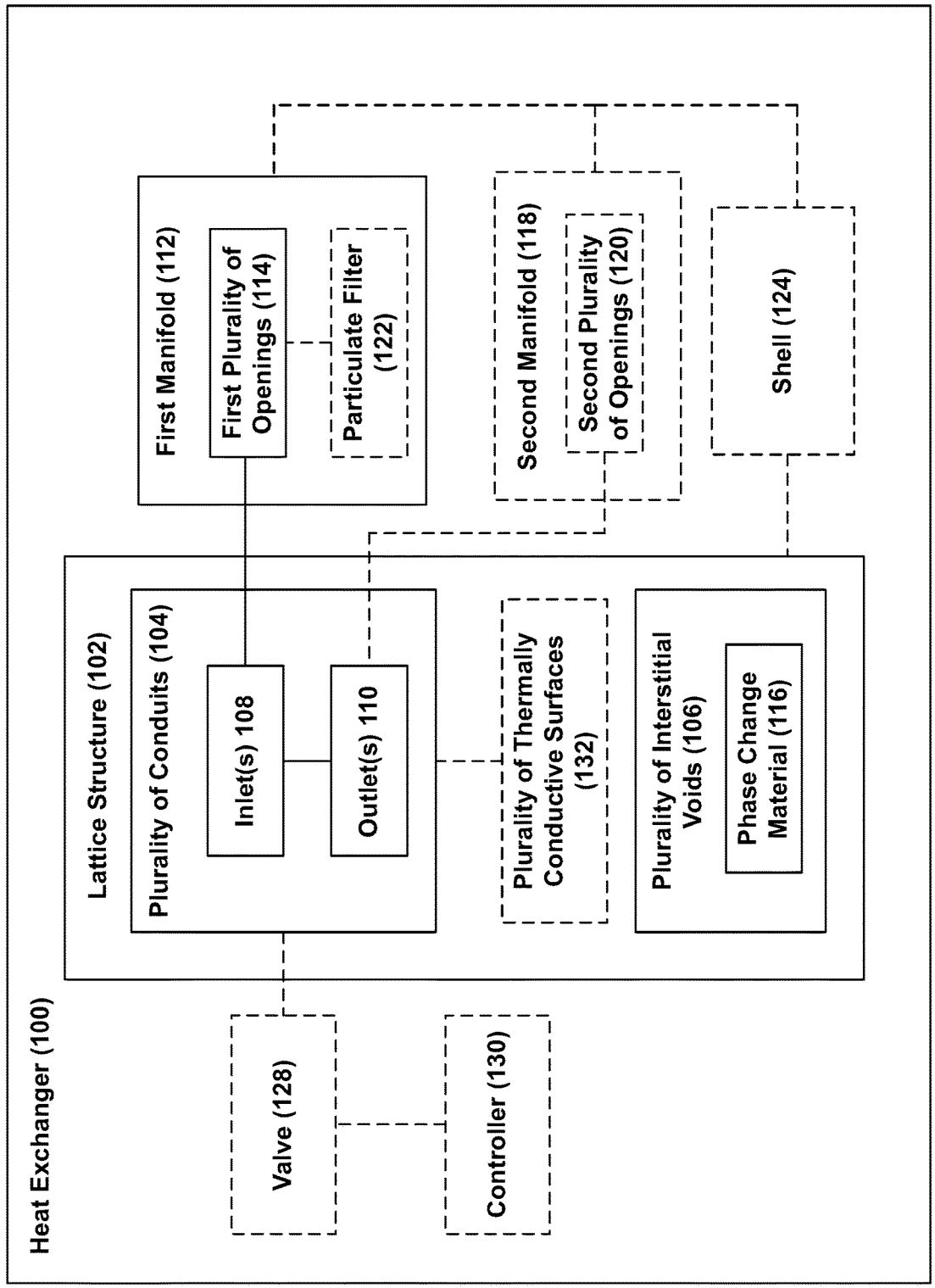
FIG. 1 is a block diagram of an example heat exchanger, according to an example embodiment.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 10:
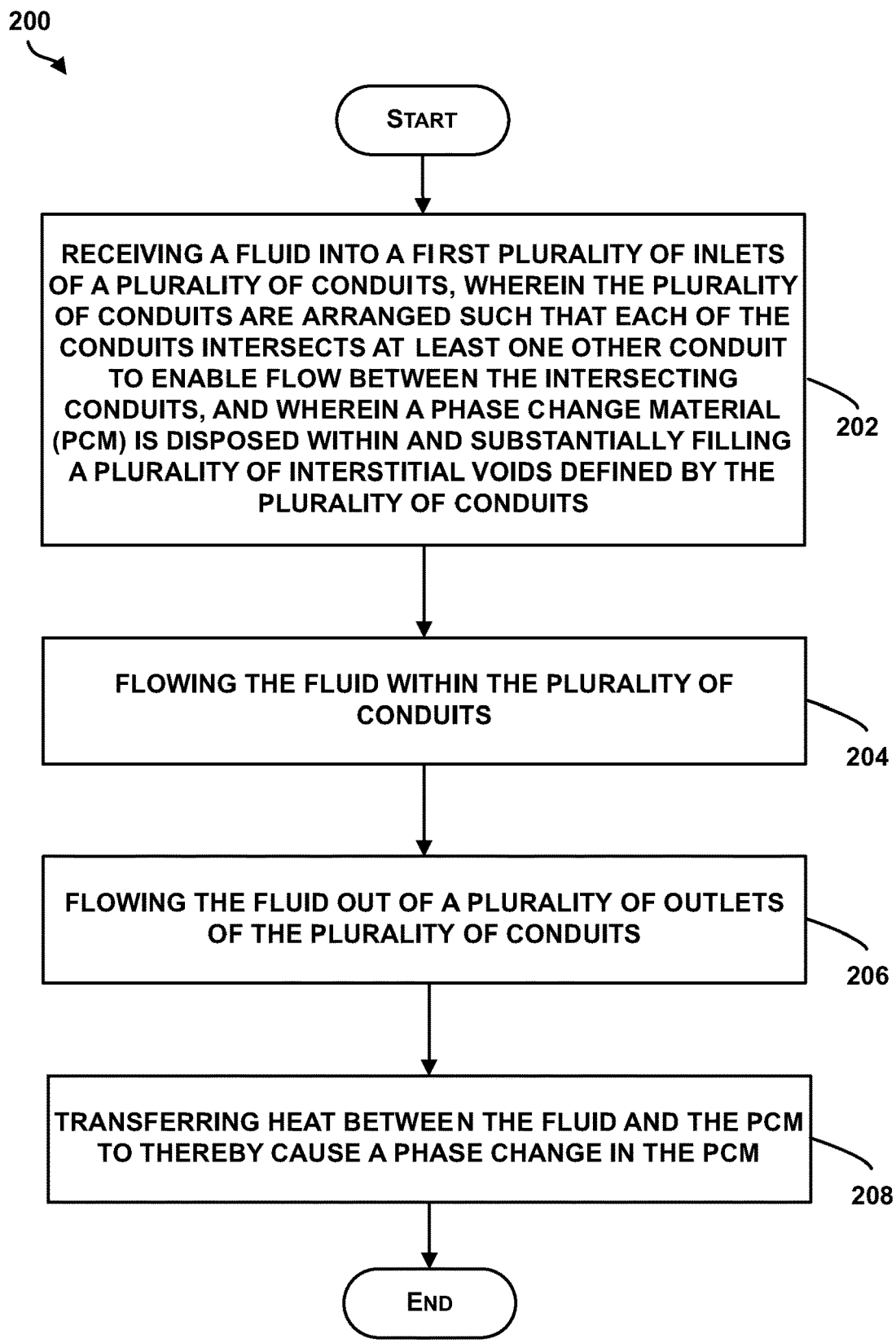
FIG. 10 is a flowchart of an example method, according to an example embodiment.

In FIG. 10, referred to above, the blocks may represent operations and/or portions thereof and lines connecting the various blocks do not imply any particular order or dependency of the operations or portions thereof. It will be understood that not all dependencies among the various disclosed operations are necessarily represented. FIG. 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" means +/−5%.

Illustrative, non-exhaustive examples, which may or may not be claimed, of the subject matter according the present disclosure are provided below.

Within examples, a hollow lattice thermal energy storage heat exchanger is described containing a phase change material matrix and an interconnected latticework of hollow microtubes. These microtubes transport a working fluid (e.g., coolant) through the PCM matrix to facilitate efficient heat exchange. The interconnected latticework of hollow microtubes provide improved efficiency and responsiveness over current state-of-the-art designs by (i) promoting mixing of the coolant fluid as it traverses the heat exchanger, which enhances heat transfer rates and inhibits thermal stratification within the coolant fluid and PCM, (ii) decreasing the heat transport length scales between the coolant fluid and PCM, and (iii) increasing the heat transfer surface area between the microtubes and PCM.

Coolant flowing through these tubes experiences multiple direction changes, which promotes mixing. This mixing, which results because of the tortuous paths of the tubes, enhances heat transfer coefficients and significantly reduces the amount of axial and radial thermal stratification within the coolant. The tortuous path of the coolant tubes also increases the surface area that is available for heat exchange with the PCM.

The heat exchanger described herein may be of interest in applications that strive to store thermal energy for use at a later time. For instance, a power generation plant operating in a hot climate may wish to store waste heat until it becomes cooler at night and the heat can be more readily dissipated to the environment. The heat exchanger may also be of interest in applications that need to dissipate large impulsive heat loads by allowing heat dissipation to occur over longer periods of time than when the load is applied (e.g., lasers).

In operation, thermal energy is stored and released when heat is added (or removed) before, during and after a phase change process of the PCM. The phase change process changes the PCM from a liquid to a solid (and vice versa), or changes the PCM from a liquid to a vapor. Heat addition (or removal) before and after the phase change is called "sensible heat" and causes the PCM to change temperature. Heat addition (or removal) during the phase change would occur at constant temperature and is called "latent heat". The heat exchanger described herein would work with both sensible and latent heat storage and release.

Various other features of the example devices and systems discussed above, as well as methods for using these devices, are also described hereinafter with reference to the accompanying figures.

Figure 2:
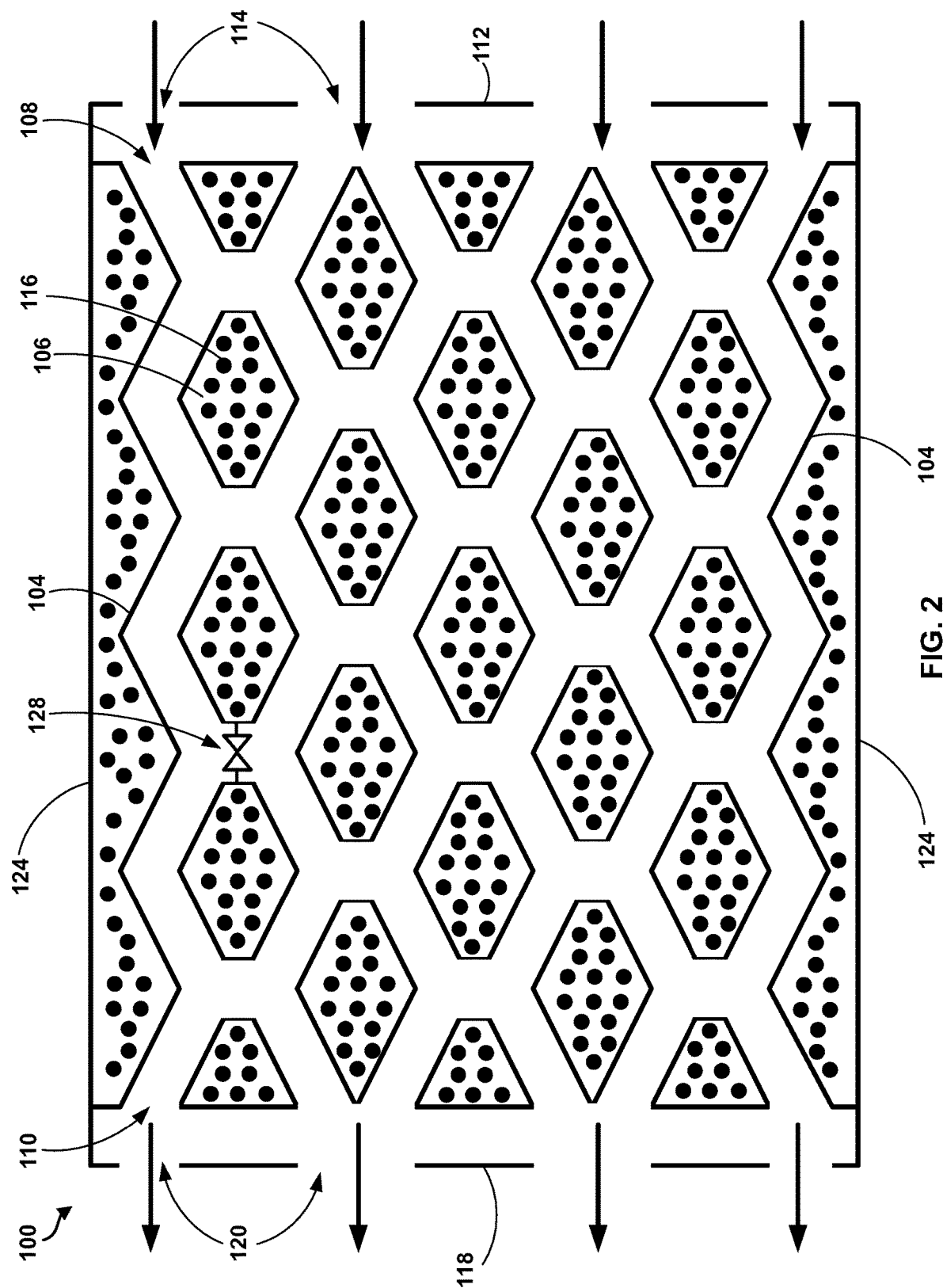
FIG. 2 is a cross-section view of an example heat exchanger, according to an example embodiment.
Figure 3A:
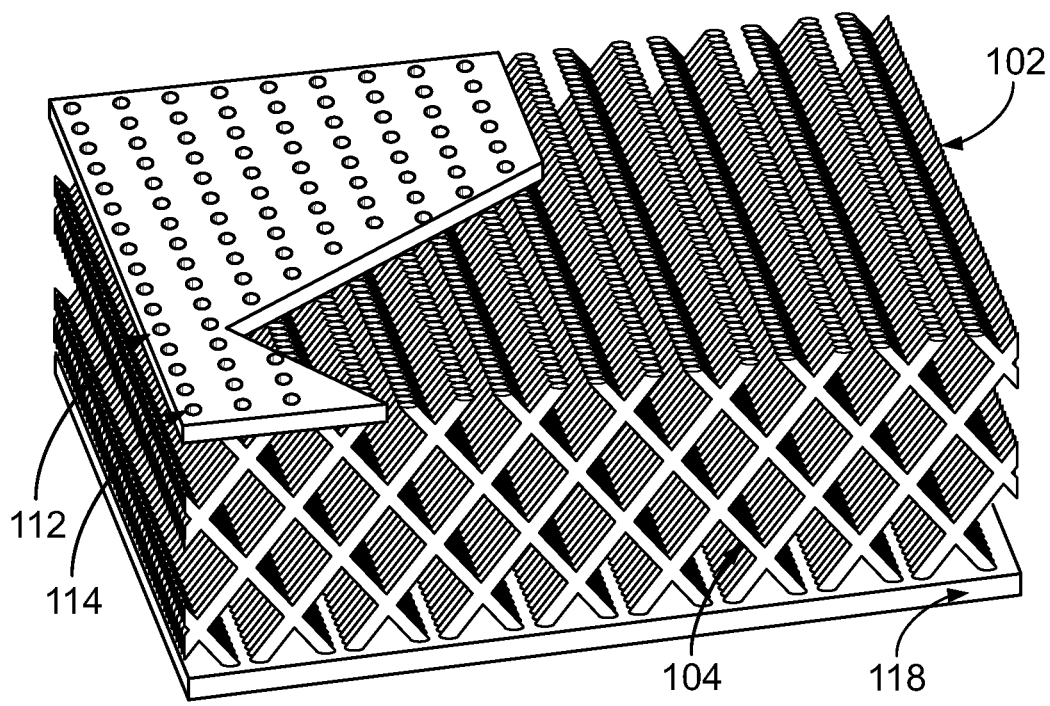
FIG. 3A is a perspective view of another example heat exchanger, according to an example embodiment.
Figure 3B:
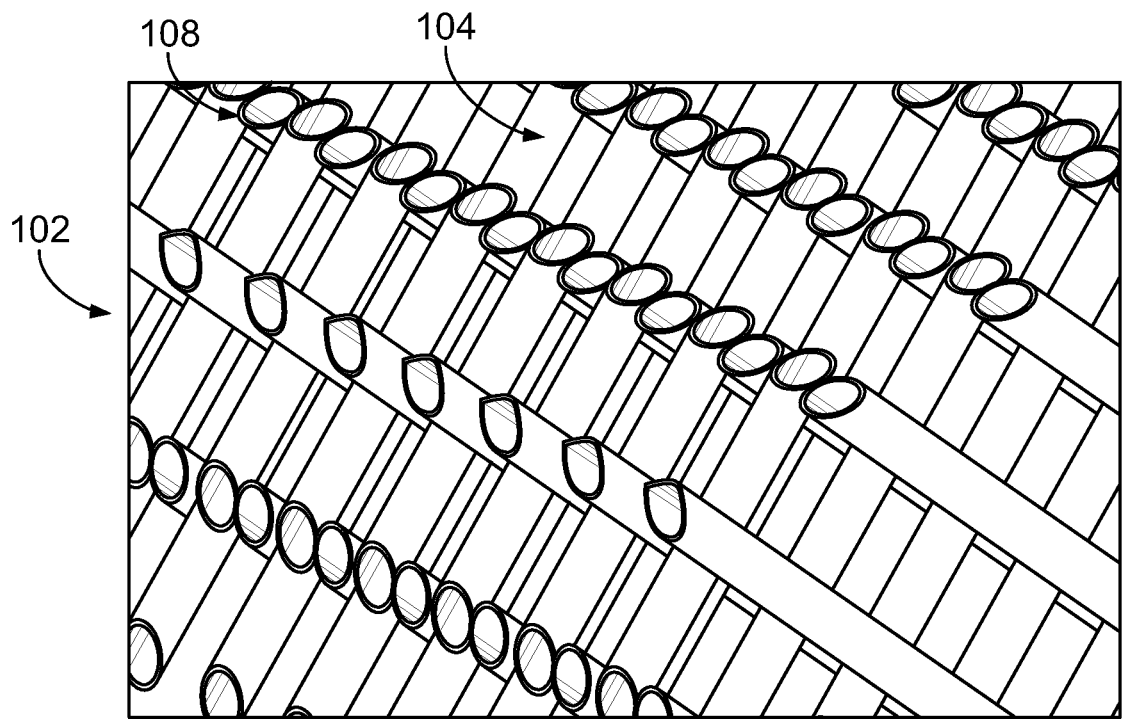
FIG. 3B is a zoomed in view of the lattice structure of the heat exchanger of FIG. 3A, according to an example embodiment.
Figure 4:
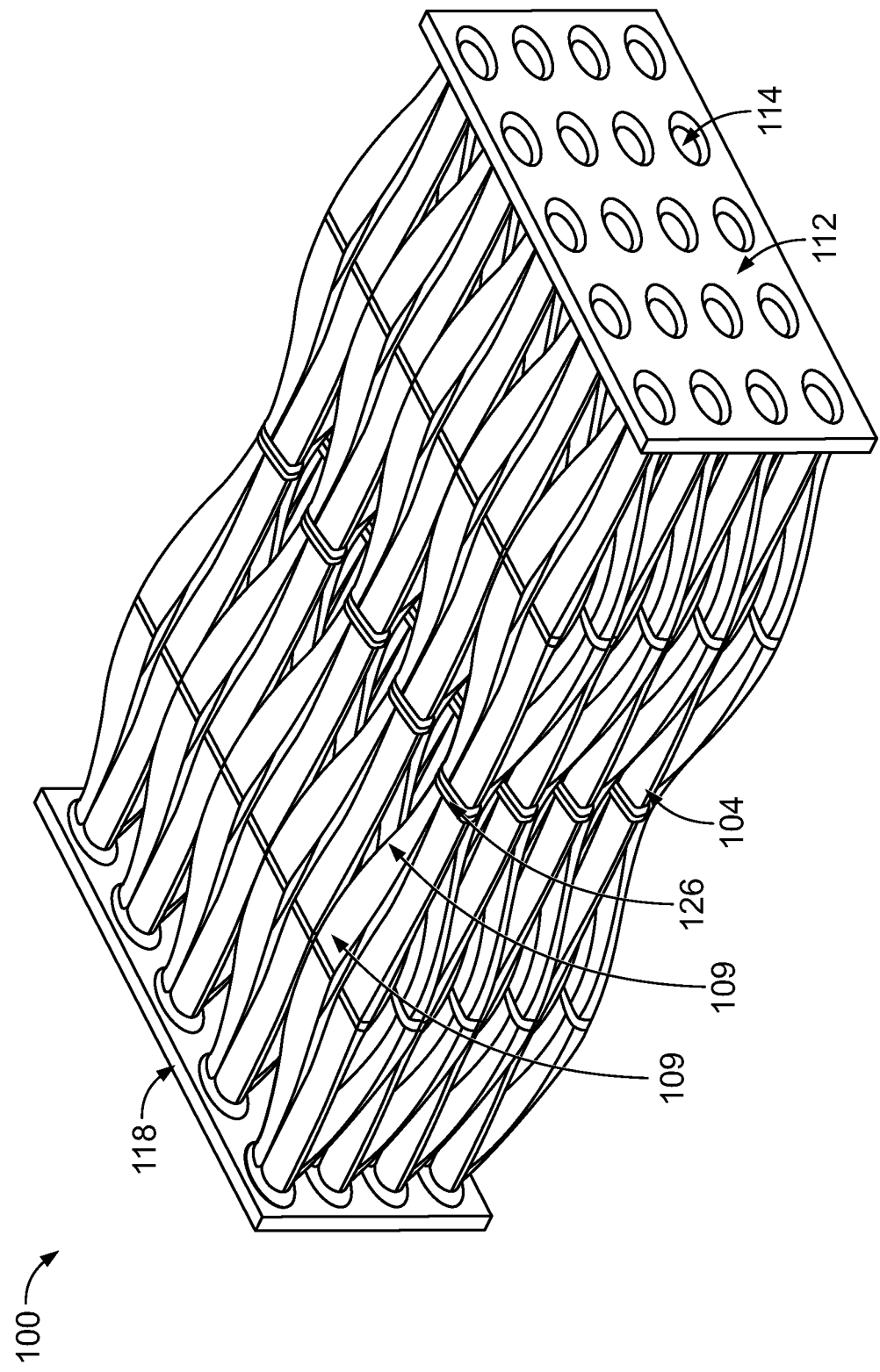
FIG. 4 is a perspective view of another example heat exchanger, according to an example embodiment.

Referring generally to FIG. 1 and particularly to, e.g., FIGS. 2-9, an exemplary heat exchanger 100 is disclosed. The heat exchanger 100 includes a lattice structure 102 including a plurality of conduits 104 defining a plurality of interstitial voids 106 between the plurality of conduits 104. As used herein, the lattice structure 102 comprises an interlaced structure or pattern. In the exemplary embodiment, and as shown in FIGS. 2-4, the lattice structure 102 pattern includes a regularly repeating three-dimensional arrangement. Each of the plurality of conduits 104 includes an inlet 108 and an outlet 110. The plurality of conduits 104 are arranged such that, between the inlet 108 and the outlet 110, each of the conduits intersects at least one other conduit to enable flow between the intersecting conduits. The heat exchanger 100 further includes a first manifold 112 formed unitarily with the lattice structure 102. Forming the first manifold 112 unitarily with the lattice structure 102 facilitates preventing leaking between components that are experienced with traditional manufacturing approaches, such as brazing, welding, bonding, and tube bending. The first manifold 112 includes a first plurality of openings 114 in fluid communication with each inlet 108 of the plurality of conduits 104. The heat exchanger 100 also includes a phase change material (PCM) 116 disposed within and substantially filling the plurality of interstitial voids 106.

The PCM may take a variety of forms. In one example, the PCM comprises an organic PCM, such as paraffin wax as an example. In another example, the PCM comprises an inorganic PCM, such as salt hydrates. In another example, the PCM is H2O. In yet another example, the PCM comprises a mixtures of salt hydrates and H2O, including, but not limited to, LiNO3-3H2O (lithium nitrate trihydrate), KF-4H2O (potassium fluoride tetrahydrate), Zn(NO3)2-6H2O (zinc nitrate hexahydrate), CaCl2-6H2O (calcium chloride hexahydrate) and Na2SO4-10H2O (sodium sulfate decahydrate). In one example, the mixture of salt hydrates and H20 are eutectic mixtures. Such eutectic mixtures may be preferred in that they (i) have sharp melting point similar to a pure substance, (ii) their volumetric storage density is slightly above organic compounds, and (iii) extra water principle can be used to avoid phase change degradation, involving dissolving the anhydrous salt during melting to result in a thickening of the liquid material so that it melts to a gel form.

As used herein, "substantially filling the plurality of interstitial voids" means that the interstitial voids 106 of the lattice structure 102 are about 100% full, with an acceptable range being between about 90% full and about 100% full. The preferred amount for a liquid PCM other than H20 is about 100% full, as more PCM 116 provides increased heat transfer from the plurality of conduits 104 to the PCM 116. The preferred amount of an H20 PCM is about 90% full, as the H20 PCM expands during freezing.

The exemplary heat exchanger 100 further includes a second manifold 118 formed unitarily with the lattice structure 102. The second manifold includes a second plurality of openings 120 in fluid communication with each outlet 110 of the plurality of conduits 104. A cross section (e.g., lateral, longitudinal, or other cross section) of at least one of the first plurality of openings 114 and the second plurality of openings 120 comprise, for example but without limitation, a tapered shape (e.g., for a longitudinal cross section), a polygon shape, a quadrilateral shape, a cross-section of a hollow pyramid (e.g., for a lateral or longitudinal cross section), or other cross section configuration. The tapered shape of the openings 114, 120 is preferred, as a smooth transition at an interface between the manifolds 112, 118 and the plurality of conduits 104 results in significantly lower pressure drop for a fluid flowing into the plurality of conduits 104 and higher pressure recovery for a fluid exiting from the plurality of conduits 104 than manifolds having a flat surface with a flush hole for each of the plurality of conduits 104. In particular, a head loss coefficient of a flow encountering a right-angle inlet is approximately 0.5, while the head loss coefficient for a filleted inlet is as low as 0.04, representing an improvement of 12.5 times.

In the example embodiment, the first manifold 112 includes a particulate filter 122. Such a particulate filter 122 is a flow obstruction that increases pressure loss, but protects the downstream components of the heat exchanger 100 from potential damage and/or fouling.

The heat exchanger 100 further includes a shell 124 coupled to and surrounding the lattice structure 102. The shell 124 is coupled to the first manifold 112 and the second manifold 118, to thereby form a closed container into which the PCM 116 is confined. In one example, the shell 124 comprises the same material as the lattice structure 102 and the manifolds 112, 118. In such an example, the shell 124 is formed unitarily with the lattice structure 102 and first manifold 112. In another example, the shell 124 comprises a different material than the lattice structure and the manifolds 112, 118.

FIG. 2 illustrates a cross-section view of an example heat exchanger, according to an example embodiment. As shown in FIG. 2, the plurality of conduits 104 includes an intersection point between at least two conduits that defines a node 126, and each conduit defines a plurality of nodes. The nodes 126 provide a fail-safe for the heat exchanger 100 such that a fluid in the plurality of conduits 104 has alternative routes if one of the plurality of conduits 104 becomes blocked.

FIG. 3A a perspective view of a heat exchanger 100, according to an example embodiment. FIG. 3A illustrates an example lattice structure 102 where each of the plurality of conduits 104 comprise a hollow three-dimensional microtruss comprising a plurality of hollow truss elements extending along at least three directions, and a plurality of hollow nodes interpenetrated by the plurality of hollow truss elements. FIG. 3A illustrates a portion of the first manifold 112, and does not include the PCM 116 or the shell 124 to better illustrate the lattice structure 102. FIG. 3B is a zoomed in view of the lattice structure 102, illustrating the inlets 108. The intricacy of the design of the lattice structure 102 (i) promotes mixing of the coolant fluid as it traverses the heat exchanger 100, which enhances heat transfer rates and inhibits thermal stratification within the coolant fluid and the PCM 116, (ii) decreases the heat transport length scales between the coolant fluid and the PCM 116, and (iii)

increases the heat transfer surface area between the plurality of conduits 104 and the PCM 116.

FIG. 4 is a perspective view of another heat exchanger 100, according to an example embodiment. As shown in FIG. 4, each of the plurality of conduits 104 includes one or more curved portions 109 between the inlet 108 and the outlet 110. In such an example, the node 126 is positioned at the curved portion where two conduits intersect. As shown in FIG. 4, each opening 114 of the first manifold 112 are in fluid communication with two inlets 108 of plurality of conduits 104. Such an arrangement promotes mixing of the fluid entering the heat exchanger 100. In addition, the design shown in FIG. 4 provides lower flow losses (e.g., pressure drop) for the working fluid passing through the plurality of conduits 104. As such, the design shown in FIG. 4 provides an alternative tradeoff between thermal performance (e.g., heat transfer to and from the PCM) and hydraulic performance (e.g., pressure drop from the inlets 108 to the outlets 110 of the plurality of conduits 104).

In one example, the heat exchanger 100 further includes one or more valves 128 positioned in one or more of the nodes 126. The valve(s) 128 are opened or closed to thereby enable fluid to flow through the nodes 126. In such an example, the heat exchanger 100 includes a controller 130 (e.g., a microprocessor, FPGA, microcontroller, or the like) configured to open or close the valve(s) 128. The valve(s) 128 may include a shape-memory alloy (SMA) to selectively open or close a given conduit of the plurality of conduits 104. An SMA is an alloy that changes shape in response to its temperature. A transition temperature defines when the alloy transitions from one shape to another. In particular, the SMA transitions from a martensitic state to an austenitic state when heated above the transition temperature, and then returns to its martensitic state when cooled below the transition temperature. In the example described above, the transition temperature determines whether the valve is in its closed position or its open position. An example of an SMA is Nitinol. Nitinol is a nickel titanium (NiTi) alloy. There are various versions of Nitinol depending on the amount of nickel as compared to titanium in the alloy. For example, Nitinol 55 includes 55% nickel by weight. The material properties of Nitinol 55 are well known. Other known versions of Nitinol include Nitinol 57 and Nitinol 60. The amount of nickel in Nitinol impacts the alloy's transition temperature.

In one example, the heat exchanger 100 includes a plurality of thermally conductive surfaces 132 coupled to and extending away from an exterior wall of at least one of the plurality of conduits 104. These thermally conductive surfaces 132 are solid ligaments that extend into the plurality of interstitial voids 106, thereby further enhancing heat transfer into the non-conductive PCM.

The shape of each of the plurality of conduits 104 may take a variety of forms. In one example, a hydraulic diameter of each of the plurality of conduits 104 is at least one order of magnitude smaller than the hydraulic diameter of the lattice structure 102 of the heat exchanger 100. For example, if the hydraulic diameter of a conduit 104 is 1 mm, the hydraulic diameter of the lattice structure 102 of the heat exchanger 100 would be at least 10 mm. As used herein, the "hydraulic diameter of the lattice structure 102" is calculated as 4 times the cross-sectional area of the lattice structure 102 divided by the wetted perimeter of the lattice structure 102. Each of the plurality of conduits 104 have a wall thickness ranging from about 25 μm to about 200 μm, and preferably between about 25 μm and about 50 μm. Such a preferred thickness provides low cost and weight to the heat exchanger 100, while also providing improved heat transfer properties.

Figure 5:
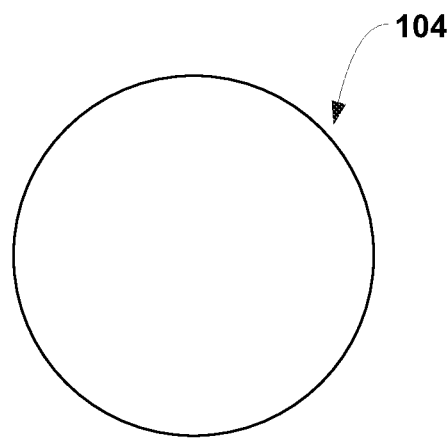
FIG. 5 is a cross-section view of an example conduit of a heat exchanger, according to an example embodiment.
Figure 6:
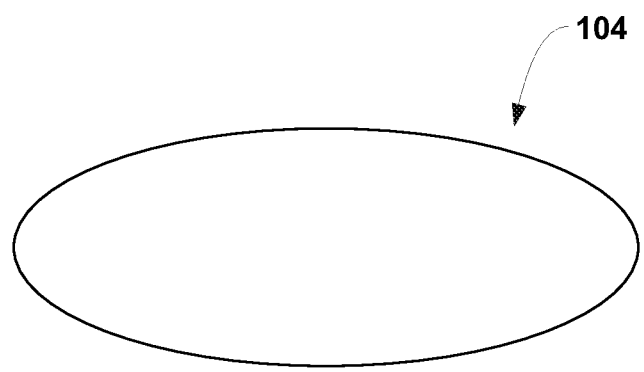
FIG. 6 is a cross-section view of another example conduit of a heat exchanger, according to an example embodiment.
Figure 7:
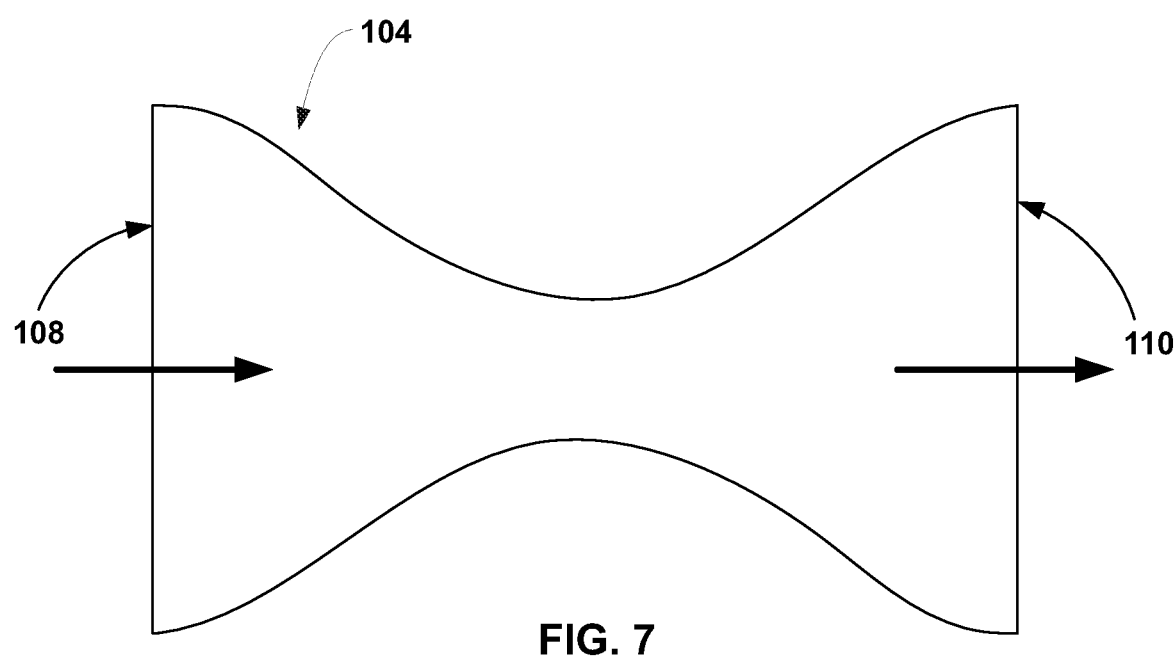
FIG. 7 is a side cross-section view of another example conduit of a heat exchanger, according to an example embodiment.

In one example, as shown in FIG. 5, a cross-section of each of the plurality of conduits 104 is circular. The circular conduit 104 provides simplicity in design and uniform heat transfer characteristics from the conduit 104 to the PCM 116. In another example, as shown in FIG. 6, a cross-section of each of the plurality of conduits 104 is non-circular. Such a cross-section may be elliptical as shown in FIG. 6, or another non-circular cross-section. The non-circular conduit 104 provides improved flow losses (e.g., pressure drop) for the working fluid passing through the plurality of conduits 104. As such, the non-circular conduit design shown in FIG. 6 provides an alternative tradeoff between thermal performance (e.g., heat transfer to and from the PCM) and hydraulic performance (e.g., pressure drop from the inlets 108 to the outlets 110 of the plurality of conduits 104). Further, in the exemplary configuration shown in FIG. 7, a cross-sectional area of each of the plurality of conduits 104 are variable from the inlet 108 to the outlet 110. The variable cross-sectional area of the plurality of conduits 104 are advantageous to manage the pressure drop of the fluid traveling through the plurality of conduits 104.

Figure 8:
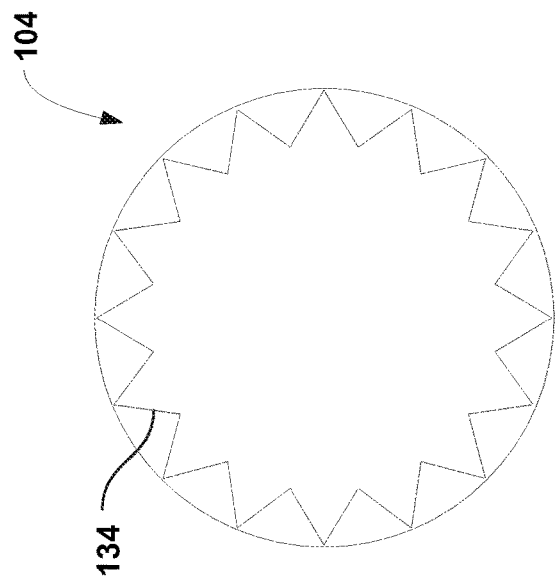
FIG. 8 is a cross-section view of an example conduit including a corrugated surface, according to an example embodiment.
Figure 9:
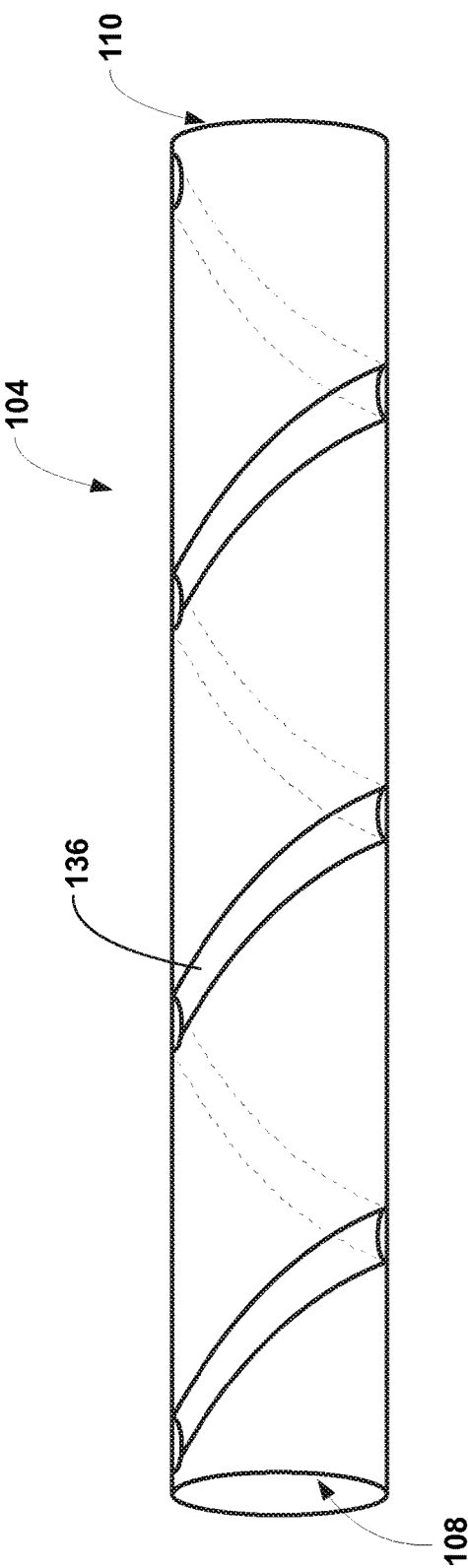
FIG. 9 is a side perspective view of an example conduit with helical channels, according to an example embodiment.

In one example, an interior surface of the plurality of conduits 104 are a corrugated surface 134, as shown in FIG. 8. The corrugated surface 134 includes jagged edges, or alternating ridges and grooves, or a series of parallel ridges and furrows. In another example, as shown in FIG. 9, the interior surface of the plurality of conduits 104 includes helical grooves 136. The corrugated surface 134 and/or helical grooves 136 assist in mixing the coolant flowing through the conduits 104, thereby reducing the amount of axial and radial thermal stratification within the coolant.

In certain embodiments, such as shown in any one of FIGS. 1-9, example devices or components thereof are made using an additive-manufacturing machine, such as stereolithography, multi-jet modeling, inkjet printing, selective laser sintering/melting, and fused filament fabrication, among other possibilities. As such, the manifolds 112, 118 can be formed unitarily with the plurality of conduits 104 eliminating potential areas of leakage between these components that is experienced with traditional manufacturing approaches, such as brazing, welding, bonding, and tube bending. In addition, the additive-manufacturing approach enables increased complexity of design and precise thicknesses of the conduits 104 that is not possible using traditional manufacturing approaches. In one example, the additive-manufacturing machine further forms the shell 124 unitarily with the manifolds 112, 118 and the plurality of conduits 104.

An example additive-manufacturing machine creates the heat exchanger 100 described in any one of FIGS. 1-9 using a single material. Such a material includes stainless steel, titanium, nickel super-alloy, aluminum, polymer composites (e.g., carbon fiber reinforced nylon) and polymer nanocomposites (e.g., carbon nanotube filled nylon), polyether ether ketone (PEEK), polyethylene (PE), or polypropylene (PP), as examples. In another example, the additive-manufacturing process is a multi-material additive-manufacturing process such that various components of the heat exchanger are formed using a material with a different elasticity or different heat transfer properties than the other components. In such an example, the manifolds 112, 118 are made from a first material, and the plurality of conduits 104 are made from a second material that is different than the first material. In one particular example, the first material prevents heat transfer from the manifolds 112, 118 to the PCM 116, and the second material encourages heat transfer from the plurality of conduits 104 to the PCM 116.

FIG. 10 is a block diagram of an example method for adjusting a fluid flow rate through a fluidic control device. Method 200 shown in FIG. 10 presents an embodiment of a method that could be used by the heat exchanger 100 of FIGS. 1-9, as an example. Method 200 includes one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, the method 200 can be caused to be performed by program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 10 may represent circuitry that is wired to perform the specific logical functions in the process.

Initially, at block 202, the method 200 includes receiving a fluid into a first plurality of inlets of a plurality of conduits. In one example, the fluid is be a coolant. In one particular example, the fluid enters the plurality of conduits at a temperature lower than a freezing temperature of the PCM. The freezing temperature of the PCM ranges from about 0° C. to about 200° C. The plurality of conduits are arranged such that each of the conduits intersects at least one other conduit to enable flow between the intersecting conduits, and a PCM is disposed within and substantially filling a plurality of interstitial voids defined by the plurality of conduits, as described above in relation to FIGS. 1-9.

At block 204, the method 200 includes flowing the fluid within the plurality of conduits. Next, at block 206, the method 200 includes flowing the fluid out of a plurality of outlets of the plurality of conduits. Next, at block 208, the method 200 includes transferring heat between the fluid and the PCM to thereby cause a phase change in the PCM. In one particular example, the liquid is a coolant that causes the PCM material to change from a liquid to a solid. The change from a liquid to solid enables the heat exchanger to release heat energy that was stored by the PCM during prior melting. In one example, the fluid is pumped from a storage container, through a transfer conduit and into the inlets of the plurality of conduits. The pump further pushes the fluid through the conduits and out of the outlets of the plurality of conduits. Another transfer conduit is in fluid communication with the outlets of the plurality of conduits to receive the used fluid, and transport the used fluid to the storage container for reuse.

In another embodiment, an example method of additively manufacturing a heat exchanger comprises (i) forming a lattice structure including a plurality of conduits defining a plurality of interstitial voids between the plurality of conduits, wherein each of the plurality of conduits includes an inlet and an outlet, and wherein the plurality of conduits are arranged such that, between the inlet and the outlet, each of the conduits intersects at least one other conduit to enable flow between the intersecting conduits, (ii) forming a first manifold unitarily with the lattice structure, the first manifold comprising a first plurality of openings in fluid communication with each inlet of the plurality of conduits, and (iii) providing a phase change material (PCM) within and substantially filling the plurality of interstitial voids. In one example, the method may further comprise (iv) forming a second manifold unitarily with the lattice structure, the second manifold comprising a second plurality of openings in fluid communication with each outlet of the plurality of conduits. These example methods may be performed by an additive-manufacturing machine, such as stereolithography, multi jet modeling, inkjet printing, selective laser sintering/melting, and fused filament fabrication, among other possibilities.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A heat exchanger comprising:
    a lattice structure including a plurality of conduits defining a plurality of interstitial voids between the plurality of conduits, wherein each of the plurality of conduits includes an inlet and an outlet, and wherein the plurality of conduits are arranged such that, between the inlet and the outlet, each of the conduits intersects at least one other conduit to enable flow between the intersecting conduits, wherein an intersection point between two conduits defines a node;
    a first manifold formed unitarily with the lattice structure, the first manifold comprising a first plurality of openings in fluid communication with each inlet of the plurality of conduits;
    a phase change material (PCM) disposed within and substantially filling the plurality of interstitial voids and contacting an exterior of the plurality of conduits;
    a shell formed unitarily with the lattice structure and the first manifold such that the shell is coupled to both the lattice structure and the first manifold, wherein the shell surrounds the lattice structure to thereby form a closed container into which the PCM is confined; and
    a valve positioned in the node between at least two conduits of the plurality of conduits, wherein the valve comprises a shape-memory alloy (SMA) that changes shape in response to temperature to control flow of fluid through the node, wherein a transition temperature of the SMA determines whether the valve is in an open position or a closed position, and wherein the SMA transitions from a martensitic state to an austenitic state when heated above a transition temperature and then returns to the martensitic state when cooled below the transition temperature.

2. The heat exchanger of claim 1, wherein the first manifold further comprises a particulate filter.

3. The heat exchanger of claim 1, further comprising:
a second manifold formed unitarily with the lattice structure, the second manifold comprising a second plurality of openings in fluid communication with each outlet of the plurality of conduits.

4. The heat exchanger of claim 3, wherein the first plurality of openings and the second plurality of openings comprise tapered openings.

5. The heat exchanger of claim 1, wherein each conduit includes a plurality of nodes.

6. The heat exchanger of claim 1, wherein the PCM comprises a mixture of salt hydrate and H2O.

7. The heat exchanger of claim 1, further comprising a plurality of thermally conductive surfaces coupled to and extending away from an exterior wall of at least one of the plurality of conduits.

8. The heat exchanger of claim 1, wherein each of the plurality of conduits has a wall thickness ranging from about 25 μm to about 200 μm.

9. The heat exchanger of claim 1, wherein a cross-section of each of the plurality of conduits is circular.

10. The heat exchanger of claim 1, wherein a cross-section of each of the plurality of conduits is non-circular.

11. The heat exchanger of claim 1, wherein a cross-sectional area of each of the plurality of conduits is variable from the inlet to the outlet.

12. The heat exchanger of claim 1, wherein each of the plurality of conduits includes one or more curved portions between the inlet and the outlet.

13. The heat exchanger of claim 1, wherein an interior surface of each of the plurality of conduits is corrugated.

14. The heat exchanger of claim 1, wherein an interior surface of each of the plurality of conduits includes helical grooves.

15. The heat exchanger of claim 1, wherein the heat exchanger is created using a multi-material additive-manufacturing process such that the first manifold comprises a first material and the plurality of conduits comprise a second material that is different than the first material.

16. The heat exchanger of claim 15, wherein the first material is selected from polyether ether ketone (PEEK), polyethylene (PE), or polypropylene (PP), and wherein the second material is selected from stainless steel, titanium, nickel super-alloy, or aluminum.

17. The heat exchanger of claim 1, wherein the plurality of interstitial voids are about 100% filled with PCM.

18. The heat exchanger of claim 1, wherein the plurality of interstitial voids are substantially filled with material consisting of the PCM.

19. The heat exchanger of claim 1, wherein the PCM is inserted directly into the plurality of interstitial voids.

20. The heat exchanger of claim 1, wherein the PCM contacts a substantial amount of the exterior of the plurality of conduits.

21. The heat exchanger of claim 1, wherein the PCM contacts an interior of the shell.

22. A non-transitory computer readable medium having stored thereon instructions, that when executed by one or more processors, cause an additive manufacturing machine to create one or more components of the heat exchanger of claim 1.

23. A method of additively manufacturing a heat exchanger, comprising:
forming a lattice structure including a plurality of conduits defining a plurality of interstitial voids between the plurality of conduits, wherein each of the plurality of conduits includes an inlet and an outlet, and wherein the plurality of conduits are arranged such that, between the inlet and the outlet, each of the conduits intersects at least one other conduit to enable flow between the intersecting conduits, wherein an intersection point between two conduits defines a node;
forming a first manifold unitarily with the lattice structure, the first manifold comprising a first plurality of openings in fluid communication with each inlet of the plurality of conduits;
providing a phase change material (PCM) within and substantially filling the plurality of interstitial voids and contacting an exterior of the plurality of conduits;
forming a shell unitarily with the lattice structure and first manifold such that the shell is coupled to both the lattice structure and the first manifold, wherein the shell surrounds the lattice structure to thereby form a closed container into which the PCM is confined; and
forming a valve positioned in the node between at least two conduits of the plurality of conduits, wherein the valve comprises a shape-memory alloy (SMA) that changes shape in response to temperature to control flow of fluid through the node, wherein a transition temperature of the SMA determines whether the valve is in an open position or a closed position, and wherein the SMA transitions from a martensitic state to an austenitic state when heated above a transition temperature and then returns to the martensitic state when cooled below the transition temperature.

24. The method of claim 23, further comprising:
forming a second manifold unitarily with the lattice structure, the second manifold comprising a second plurality of openings in fluid communication with each outlet of the plurality of conduits.

25. A heat exchanger comprising:
a lattice structure including a plurality of conduits defining a plurality of interstitial voids between the plurality of conduits, wherein each of the plurality of conduits includes an inlet and an outlet, and wherein the plurality of conduits are arranged such that, between the inlet and the outlet, each of the conduits intersects at least one other conduit to enable flow between the intersecting conduits, wherein an intersection point between two conduits defines a node;
a first manifold formed unitarily with the lattice structure, the first manifold comprising a first plurality of openings in fluid communication with each inlet of the plurality of conduits;
a phase change material (PCM) disposed within and substantially filling the plurality of interstitial voids; and
a valve positioned in the node between at least two conduits of the plurality of conduits, wherein the valve comprises a shape-memory alloy (SMA) that changes shape in response to temperature to control flow of fluid through the node, wherein a transition temperature of the SMA determines whether the valve is in an open position or a closed position, and wherein the SMA transitions from a martensitic state to an austenitic state when heated above a transition temperature and then returns to the martensitic state when cooled below the transition temperature, wherein the heat exchanger is created using a multi-material additive-manufacturing process such that the first manifold comprises a first material selected from polyether ether ketone (PEEK), polyethylene (PE), or polypropylene (PP), and wherein the plurality of conduits comprise a second material selected from stainless steel, titanium, nickel super-alloy, or aluminum.

* * * * *